(12) United States Patent
Wada

(10) Patent No.: US 6,807,996 B2
(45) Date of Patent: Oct. 26, 2004

(54) PNEUMATIC TIRE

(75) Inventor: Yasuo Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/923,386

(22) Filed: Aug. 8, 2001

(65) Prior Publication Data
US 2002/0043320 A1 Apr. 18, 2002

(30) Foreign Application Priority Data

Aug. 22, 2000 (JP) .................................. 2000-251252

(51) Int. Cl.$^7$ .................. B60C 15/00; B60C 15/06; B60C 9/00
(52) U.S. Cl. .................. 152/539; 152/541; 152/543; 152/546; 152/552; 152/554; 152/555
(58) Field of Search ............... 152/539, 541, 152/542, 543, 546, 552, 555

(56) References Cited

U.S. PATENT DOCUMENTS

| | | | |
|---|---|---|---|
| 4,766,940 A | | 8/1988 | Yokoyama et al. |
| 4,773,462 A | * | 9/1988 | Ohkuni et al. ............... 152/530 |
| 4,934,431 A | | 6/1990 | Agari et al. |
| 5,117,886 A | * | 6/1992 | Tokutake ..................... 152/454 |
| 5,479,977 A | * | 1/1996 | Tamano et al. ............. 152/542 |

FOREIGN PATENT DOCUMENTS

| | | | |
|---|---|---|---|
| EP | 0 780 248 A | | 6/1997 |
| EP | 0985556 | * | 3/2000 |
| JP | 1-33363 | | 7/1989 |
| JP | 7-156611 | * | 6/1995 |
| JP | 9-48219 | * | 2/1997 |
| JP | 11-263105 | * | 9/1999 |

* cited by examiner

Primary Examiner—Jeff H. Aftergut
Assistant Examiner—Justin Fischer
(74) Attorney, Agent, or Firm—Birch, Stewart, Kolasch & Birch, LLP

(57) ABSTRACT

A pneumatic tire comprises a bead core and a rubber bead apex provided in each bead portion, and a carcass comprising a carcass ply turned up around the bead core from the inside to the outside of the tire to form a pair of turned up portions and a main portion therebetween. The bead apex is made of hard rubber disposed between the main portion and turned up portion and extending radially outwards from the bead core. The length (LA) of the bead apex is in a range of from 0.1 to 0.25 times the tire section height (H). A reinforcing cord layer is disposed along the axially inside of the turned up portion. The radially outer end (FU) of the reinforcing cord layer is positioned radially outside the radially outer end (BU) of the bead apex but radially inside the maximum tire section width point (M). The radially inner end (FD) of the reinforcing cord layer is positioned radially outside the radially outer end of the bead core but radially inside the radially outer end (BU) of the bead apex. The length (LB) of the reinforcing cord layer is in a range of from 1.2 to 2.0 times the bead apex length LA. The sidewall portion of the tire has a minimum thickness (Wmin) being in a range of not more than 0.5 times a maximum thickness (Wmax) of a region where the reinforcing cord layer exists.

5 Claims, 5 Drawing Sheets

PNEUMATIC TIRE

TECHNICAL FIELD OF THE INVENTION

The present invention relates to a pneumatic tire, more particularly, to a bead and lower-sidewall structure being capable of reducing the tire weight without deteriorating tire performance.

BACKGROUND OF THE INVENTION

In recent years, from a point of view of environmental protection, it has become very important for automobile tires or pneumatic tires to reduce tire weight. The tire weight can be easily decreased by decreasing the thicknesses of rubber components and the ply number of the carcass. But, there is a possibility that the steering stability will deteriorate by the resultant decrease in tire rigidity. If rubber thickness, for example the sidewall rubber thickness, is decreased, then the vibration increases due to resonance of the air in the tire whose fundamental frequency is about 200 to 250 Hz. This becomes a problem for the recent silent high-grade passenger cars.

In the published Japanese patent application JP-B2-1-33363, a radial tire for passenger cars is disclosed, wherein, the radial carcass comprises at least one ply of nylon or polyester or rayon cords, and as shown in FIG. 5, the bead portion is provided between a carcass ply turned up portion (c1) and a rubber filler (b) with a reinforcing layer (a) of aromatic polyamide or metallic cords arranged at an angle of from 45 to 75 degrees with respect to the carcass cords. The reinforcing layer (a) extends from the bead base to a radial height of from 50 to 75% of the tire section height. The radially outer end of the rubber filler (b) which has a dynamic elastic modulus of at least 300 kg/sq.cm, reaches to a radial height of 30 to 70% of the tire section height. The objective of such structure is to improve the steering stability by effectively reinforcing the bead portion and sidewall portion. In such a tire, as the bead portion and sidewall portion are reinforced by the relatively large-sized rubber filler and reinforcing layer, a considerable weight increase is inevitable.

SUMMARY OF THE INVENTION

It is therefore, an object of the present invention to provide a pneumatic tire in which the tire weight is reduced without deteriorating other performance such as steering stability, noise performance and the like.

According to the present invention, a pneumatic tire comprises a tread portion, a pair of sidewall portions, a pair of bead portions each with a bead core and a bead apex therein, a carcass comprising a ply of cords extending between the bead portions through the tread portion and sidewall portions and turned up around the bead core in each bead portion from the inside to the outside of the tire so as to form a pair of turned up portions and a main portion therebetween, the bead apex made of hard rubber disposed between the main portion and turned up portion and extending radially outwards from the bead core, a length (LA) of the bead apex between the radially inner end and radially outer end thereof being in a range of from 0.1 to 0.25 times the section height (H) of the tire, a reinforcing cord layer disposed along the axially inside of each turned up portion, the reinforcing cord layer having a radially outer end (FU) which is positioned radially outside the radially outer end (BU) of the bead apex but radially inside the maximum tire section width point (M), and a radially inner end (FD) which is positioned radially outside the radially outer end of the bead core but radially inside the radially outer end (BU) of the bead apex, a length (LB) of the reinforcing cord layer between the radially inner end and the radially outer end thereof being in a range of from 1.2 to 2.0 times the length LA of the bead apex, the sidewall portions having a minimum thickness (Wmin) being in a range of not more than 0.5 times a maximum thickness (Wmax) of a region where the reinforcing cord layer exists.

An embodiment of the present invention will now be described in detail in conjunction with the accompanying drawings.

DETAILED DESCRIPTION OF THE INVENTION

Figure 1:
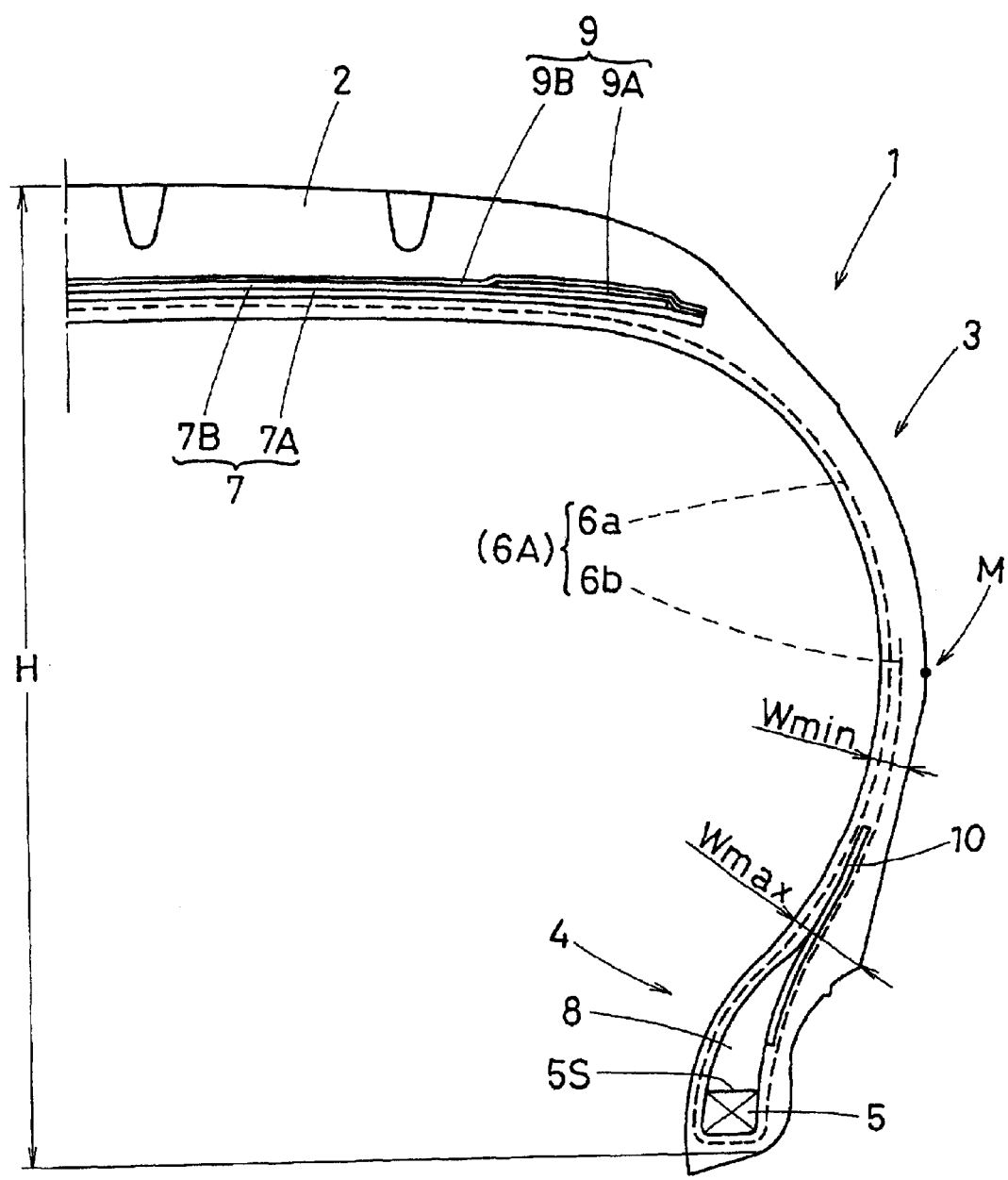
FIG. 1 is a cross sectional view of a tire according to the present invention.
Figure 2:
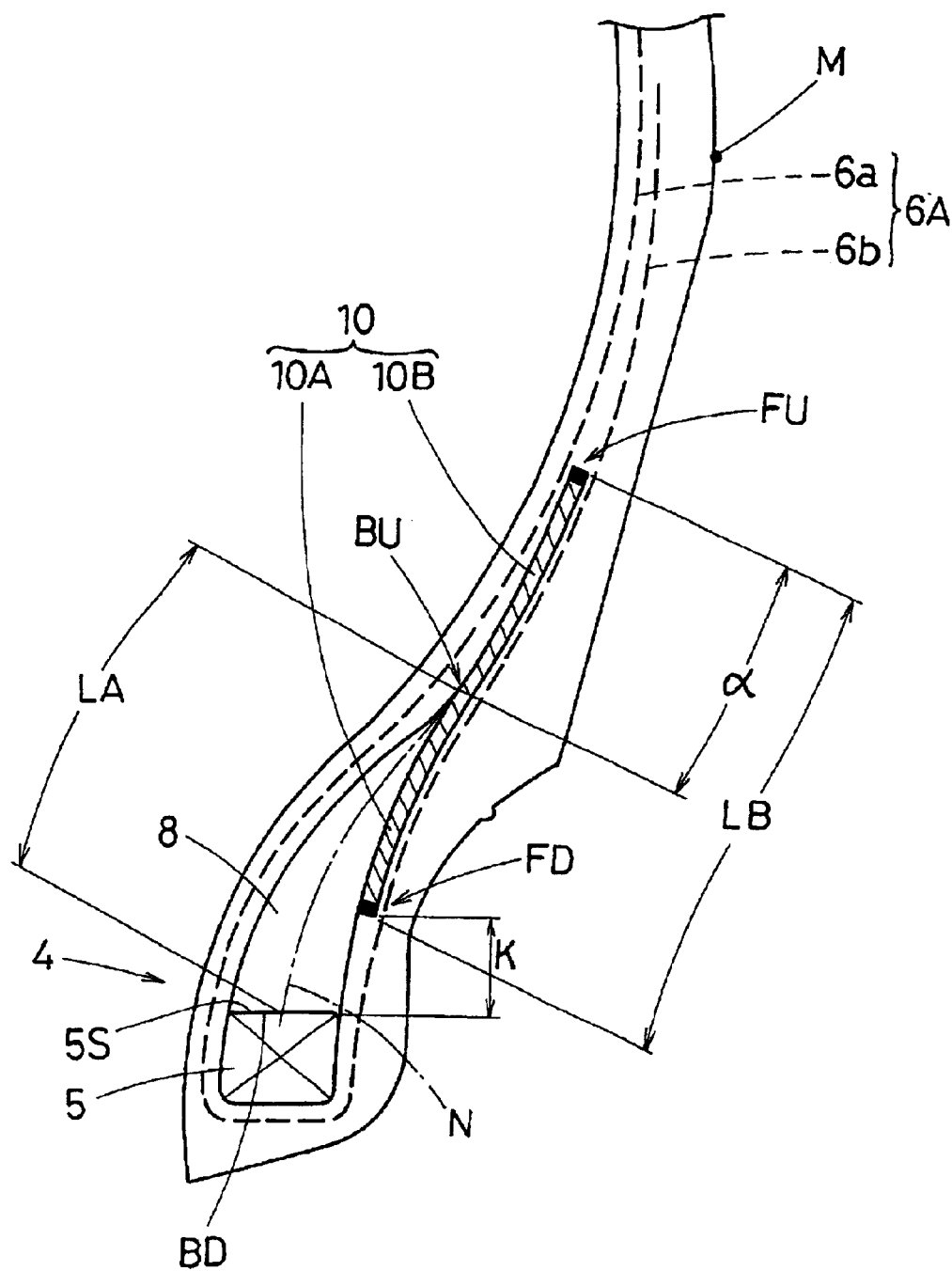
FIG. 2 is an enlarged cross sectional view of the bead and lower-sidewall thereof.

In the drawings, pneumatic tire 1 according to the present invention comprises a tread portion 2, a pair of axially spaced bead portions 4 each with a bead core 5 therein, a pair of sidewall portions 3, a carcass 6 extending between the bead portions 4, and a belt 7, 9 disposed radially outside the carcass 6 in the tread portion 2.

In FIG. 1, shown is a radial tire of size 225/60R16 for passenger cars under a normally inflated unloaded condition. Under this condition, the tire 1 has a section height H and a maximum tire section width point M in the sidewall portion 3. Here, the normally inflated unloaded condition is such that the tire is mounted on a standard rim and inflated to a standard pressure, but loaded with no tire load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. The standard load is the "maximum load capacity" in JATMA, the "Load Capacity" in ETRTO, the maximum value given in the above-mentioned table in T&RA or the like.

The carcass 6 comprises at least one ply of cords arranged radially at an angle of 90 to 70 degrees with respect to the tire equator, and extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween. In this example, the carcass 6 is composed of a single ply 6A of cords arranged radially at 90 degrees. For the carcass cords, organic fiber cords, e.g. nylon, polyester, rayon and aromatic polyamide and the like are suitably used.

The belt comprises a breaker 7 and an optional band 9 disposed on the radially outside of the breaker 7.

The breaker 7 is disposed on the radially outside of the carcass 6 and composed of at least two cross plies 7A and 7B of parallel cords laid at an angle of from 10 to 35 degrees with respect to the circumferential direction. For the breaker, high-modulus cords such as aromatic polyamide fiber cords, steel cords and the like can be used.

The band 9 is disposed on the radially outside of the breaker 7 so as to cover at least the edge portions of the breaker 7. Thus, the band 9 may be of (a) an axially spaced two-piece structure wherein the two pieces 9A cover the respective edge portions; (b) a one-piece structure wherein the piece 9B extends across the substantially overall width of the breaker 7; or (c) a combination of the axially spaced two-pieces 9A and the full-width piece 9B. Preferably, the band is formed by spirally winding at least one organic fiber cord, e.g. nylon and the like, at an angle of not more than 5 degrees with respect to the tire equator. In this embodiment, the band 9 is a combination of axially spaced two-pieces 9A and a full-width piece 9B thereon.

The bead portions 4 are each provided between the main portion 6a and turned up portion 6b with a bead apex 8.

The bead apex 8 is made of hard rubber extending radially outwards from the radially outside 5S of the bead core 5, while tapering towards its radially outer end. Preferably, the bead apex 8 is made of rubber having a hardness (type-A durometer hardness according to Japanese Industrial Standard K6253) of from 60 to 95 degrees. It is important for the bead apex 8 to minimize the volume in order to reduce the low-frequency road noise and the tire weight. Therefor, the bead apex length LA which is measured from the radially inner end BD and outer end BU of the bead apex 8 along the center line N thereof is decreased into a range of from 0.1 to 0.25 times the tire section height H.

Further, the bead portions 4 are each provided between the carcass ply turned up portion 6b and the bead apex 8 with a reinforcing cord layer 10.

The reinforcing cord layer 10 extends along the axially outer surface of the bead apex 8. The reinforcing cord layer 10 is composed of a single layer of cords laid at an angle of from 15 to 60 with respect to the circumferential direction. For the reinforcing cords, steel cords are used in this embodiment, but organic fiber cords may be also used.

The following are very important for the reinforcing cord layer 10:
1) the length LB of the reinforcing cord layer, which is measured between the radially inner end FD and outer end FU of the reinforcing cord layer 10 along the reinforcing cord layer 10, is in a range of from 1.2 to 2.0 times the bead apex length LA;
2) the radially outer end FU of the reinforcing cord layer 10 is disposed radially outside the radially outer end BU of the bead apex 8 but radially inside the maximum tire section width point M;
3) the radially inner end FD of the reinforcing cord layer 10 is disposed radially outside the radially outer end of the bead core 5 but radially inside the radially outer end BU of the bead apex 8; and
4) the axially outer surface of the reinforcing cord layer 10 is completely covered with the carcass ply turned up portion 6b to control separation failures starting from the radially inner end FD and radially outer end FU of the reinforcing cord layer 10.

In other words, the reinforcing cord layer 10 is made up of a main portion 10A sandwiched between the bead apex 8 and carcass ply turned up portion 6b, and a protruding portion 10B protruding from the radially outer end BU of the bead apex 8 and sandwiched between the carcass ply main portion 6a and turned up portion 6b while directly contacting therewith.

The length alpha of the protruding portion 10B which is measured between the radially outer ends FU and BU along the reinforcing cord layer 10 is set in range of not less than 10.0 mm, preferably not less than 15.0 mm.

The radial distance (K) of the radially inner end FD from the radially outer end of the bead core 5 is set in a range of from 0.1 to 0.5 times the bead apex length LA.

To decrease the rubber volume in the sidewall portion, the minimum thickness Wmin of the sidewall portion 3 is set in a range of not more than 0.5 times the maximum thickness Wmax in the region where the above-mentioned reinforcing cord layer 10 exists. Here, the thickness is defined as being measured normally to the inner surface of the tire.

In this embodiment, the thickness of the sidewall portion becomes maximum near the radially outer end BU of the bead apex 8. From this maximum thickness Wmax, the thickness gradually decreases towards the radially outside and becomes minimum in between the radially outer end FU of the reinforcing cord layer 10 and the maximum tire section width point M. From this minimum thickness Wmin, the thickness gradually increases near to the maximum tire section width point M. From the maximum tire section width point M to a tire shoulder, the thickness is almost constant.

By the bead apex 8 and the main portion 10A of the reinforcing cord layer overlapping therewith, a lateral stiffness which is necessary for the steering stability can be provided for the tire. As the protruding portion 10B of the reinforcing cord layer and the main portion 6a and turned up portion 6b of the carcass adjoin each other, their cords form a stiff triangle arrangement, and the circumferential rigidity is greatly increased to improve the steering stability. If the length alpha of the protruding portion 10B is less than 10.0 mm, it is difficult to increase the circumferential rigidity. If the protruding portion 10B extends over the maximum tire section width point M, then the circumferential rigidity excessively increases and the noise performance deteriorates. If the reinforcing cord layer 10 overlap the bead core 5, as the reinforcing cord layer 10 is secured to the stiff bead core 5, the vertical rigidity increases to hinder the improvement in the low-frequency road noise. If the length LB of the reinforcing cord layer is less than 1.2 times the bead apex length LA, then the lateral stiffness and/or the circumferential rigidity become insufficient, and it is difficult to improve the steering stability. If the length LB is more than 2.0 times the bead apex length LA, the circumferential rigidity excessively increases to hinder the improvement in the low-frequency road noise and the tire weight increases. If the bead apex length LA is less than 0.1 times the tire section height H, it is difficult to maintain good steering stability. If the bead apex length LA is more than 0.25 times the tire section height H, it is difficult to reduce the tire weight, and the vertical rigidity of the tire increases which makes it difficult to improve noise performance (low-frequency road noise). If the thickness of the sidewall portion is decreased, the sidewall portion becomes liable to vibrate when a resonance of the air in the tire occurs. But, the increased circumferential rigidity can control the vibration to improve noise performance.

From a point of view of steering stability, it is preferable that the lower limit for the ratio LB/LA is set at a value in a range of not less than 1.5. On the other hand, it is preferable that the upper limit for the ratio LB/LA is set at a value in a rage of not more than 1.8 form a point of view of low-frequency road noise.

Comparison Test

Test tires of size 225/60R16 (wheel rim size: 7JX16) for passenger cars were made based on the structure shown in FIG. 1 but changing various parameters as shown in Table 1 and tested for the steering stability and noise performance as follows.

1. Steering Stability Test

Figure 4:
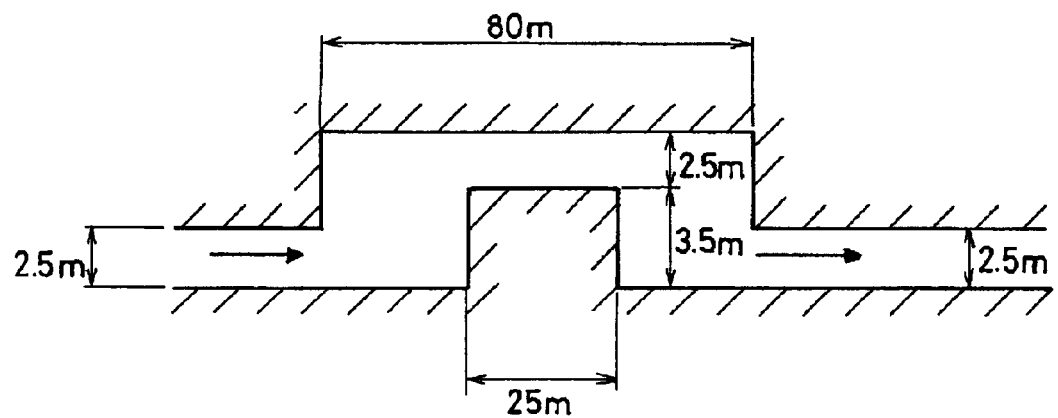
FIG. 4 is a schematic plan view showing a test course for steering stability test.
Figure 5:
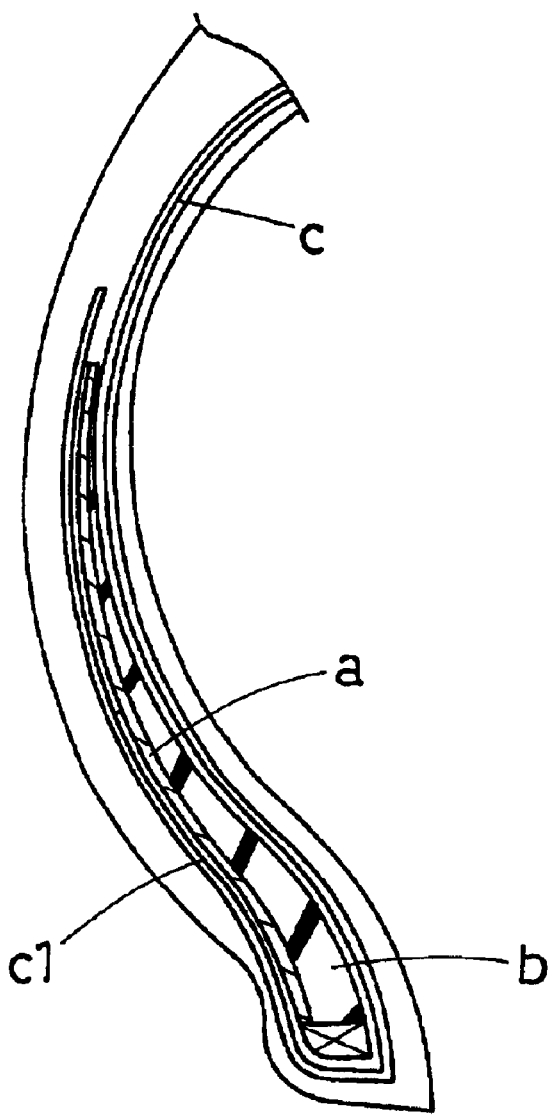
FIG. 5 is a cross sectional view showing the prior art structure.

Using a 4000cc FR passenger car provided on the four wheels with test tires (Inner pressure: 250 kPa), the steering stability when passing through a crank shaped course shown in FIG. 4 at a speed of 80 km/h (simulation of severe lane change) was evaluated into ten ranks by the test driver. The higher the rank number, the better the stability.

2. Noise Performance Test 2.1 Low-frequency Road Noise Test

The above-mentioned test car was run on a rough asphalt road at a speed 60 km/h. During running, the noise was measured near the driver's right-hand ear (outer side of the car) and a ⅓ octave frequency analysis was made thereon to obtain a maximum occurred in a low frequency band of from 100 to 160 Hz.

2.2 Resonance Noise Test

The above-mentioned test car was run on a rough asphalt road at a speed 60 km/h. During running, the test driver evaluated the noise heard inside the car into ten ranks. The higher the rank number, the better the noise.

Figure 3:
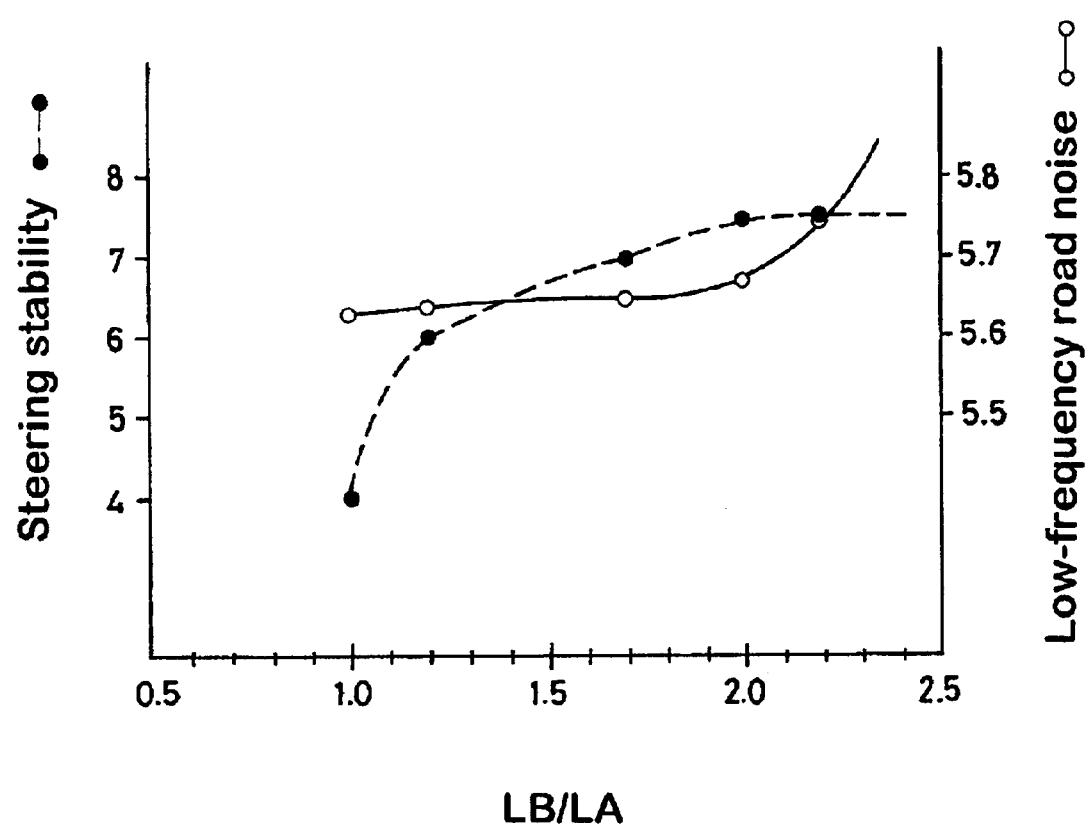
FIG. 3 is a graph showing the steering stability and low-frequency road noise as a function of the ratio LB/LA.

The test results are shown in Table 1. Further, as to Ex. tires 1, 2 and 3 and Ref. tires 1 and 2, the test results relating to the steering stability and low-frequency road noise are plotted in FIG. 3 as a function of the ratio LB/LA.

and in order to make up the resultant decrease in the vertical rigidity of the tire, the reinforcing cord layer is disposed in the boundary area between the bead portion and sidewall portion while overlapping the bead apex to provide circumferential rigidity. Therefore, good steering stability can be obtained. Further, by the decreased vertical rigidity, the noise performance can be improved. Thus, the tire weight is effectively decreased while maintaining good steering stability and noise performance.

What is claimed is:

1. A pneumatic tire comprising a tread portion, a pair of sidewall portions, a pair of bead portions each with a bead core and a bead apex therein, a carcass comprising a ply of cords extending between the bead portions through the tread portion and sidewall portions and turned up around the bead core in each said bead portion from the inside to the outside of the tire so as to form a pair of turned up portions and a main portion therebetween, said bead apex made of hard rubber disposed between the main portion and turned up portion and extending radially outwards from the bead core, a length (LA) of the bead apex between the radially inner end and radially outer end thereof being in a range of from 0.1 to 0.25 times the section height (H) of the tire, a reinforcing cord layer composed of a single ply of cords disposed along the axially inside of each said turned up portion, the reinforcing cord layer having a radially outer end (FU) which is positioned radially outside the radially outer end (BU) of the bead apex but radially inside the maximum tire section width point (M), and a radially inner end (FD) which is positioned radially outside the radially outer end of the bead core but

TABLE 1

| Tire | Ex.1 | prior | Ex.2 | Ex3. | Ref.1 | Ref.2 | Ref.3 | Ref.4 | Ref.5 | Ex.4 | Ex.5 |
|---|---|---|---|---|---|---|---|---|---|---|---|
| Tire section height H (mm) | 135.5 | 135.5 | 135.5 | 135.5 | 135.5 | 135.5 | 135.5 | 135.5 | 135.5 | 135.5 | 136.5 |
| Bead apex length LA (mm) | 25 | 25 | 25 | 25 | 25 | 25 | 25 | 35 | 10 | 25 | 25 |
| LA/H | 0.18 | 0.18 | 0.18 | 0.18 | 0.18 | 0.18 | 0.18 | 0.26 | 0.07 | 0.18 | 0.18 |
| Reinforcing cord layer | | none | | | | | | | | | |
| Cord material | steel | | steel | steel | steel | steel | steel | steel | steel | steel | steel |
| Cord angle (degree) | 25 | | 25 | 25 | 25 | 25 | 25 | 25 | 25 | 25 | 25 |
| Length LB (mm) | 43 | | 30 | 50 | 25 | 55 | 43 | 43 | 20 | 30 | 43 |
| LB/LA | 1.7 | | 1.2 | 2 | 1 | 2.2 | 1.7 | 1.2 | 2 | 1.2 | 1.7 |
| Length alpha (mm) | 23 | | 10 | 30 | 10 | 35 | 23 | 13 | 15 | 7 | 23 |
| Distance K (mm) | 3 | | 3 | 3 | 6 | 3 | 3 | 3 | 3 | 1 | 3 |
| Sidewall portion | | | | | | | | | | | |
| Thickness Wmin (mm) | 5.5 | 5.5 | 5.5 | 5.5 | 5.5 | 5.5 | 7 | 5.5 | 5.5 | 5.5 | 5.5 |
| Thickness Wmax (mm) | 13 | 13 | 13 | 13 | 13 | 13 | 13 | 13 | 13 | 13 | 13 |
| Wmin/Wmax | 0.42 | 0.42 | 0.42 | 0.42 | 0.42 | 0.42 | 0.53 | 0.42 | 0.42 | 0.42 | 0.42 |
| Carcass ply number | 1 | 1 | 1 | 1 | 1 | 1 | 1 | 1 | 1 | 1 | 2 |
| Tire weight | 100 | 97 | 99 | 101 | 98 | 102 | 104 | 102 | 96 | 99 | 105 |
| Steering stability | 7 | 3 | 6 | 7.5 | 4 | 7.5 | 7 | 7 | 3 | 5 | 8 |
| Noise performance | | | | | | | | | | | |
| Low-frequency road noise | 56.5 | 56.3 | 56.4 | 56.7 | 56.3 | 57.4 | 56.6 | 57.2 | 55.8 | 56.5 | 57.5 |
| Resonance noise | 7 | 5 | 6 | 7 | 7 | 7 | 7 | 7 | 5.5 | 5.5 | 7 |

From the test results, it was confirmed that the weight reduction can be achieved while maintaining steering stability and noise performance at a good level.

As described above, in the pneumatic tire according to the present invention, the rubber volume is decreased in the sidewall portion and bead portion to decrease the weight, radially inside the radially outer end (BU) of the bead apex so that the reinforcing cord layer comprises a main portion disposed between the bead apex and carcass ply turned up portion, and a protruding portion protruding radially outwardly from the radially outer end (BU) of the bead apex, and the protruding portion adjoins the carcass ply main portion and turned up portion to form a triangle cord arrangement, a length (LB) of the reinforcing cord layer between the radially inner end and the radially outer end thereof being in a range of from 1.2 to 2.0 times said length (LA) of the bead apex, a length (alpha) of the protruding portion being in a range of not less than 10.0 mm, the sidewall portions having a minimum thickness (Wmin) being in a range of not more than 0.5 times a maximum thickness (Wmax) of a region where the reinforcing cord layer exists, wherein said minimum thickness (Wmin) occurs between the radially outer end (FU) of the reinforcing cord layer and the maximum tire section width point (M) and between the radially outer end (FU) of the reinforcing cord layer and the radially outer end of the turned up portion, and said maximum thickness (Wmax) occurs near the radially outer end (BU) of the bead apex.

2. The pneumatic tire according to claim 1 wherein the carcass is composed of a single ply of radially arranged cords.

3. The pneumatic tire according to claim 1 or 2, wherein a radial distance (K) of the radially inner end (FD) of the reinforcing cord layer from the radially outer end (BD) of the bead core is set in a range of from 0.1 to 0.5 times the length (LA) of the bead apex.

4. The pneumatic tire according to claim 1, wherein the ratio (LB/LA) of the length (LB) of the reinforcing cord layer and the length (LA) of the bead apex is in a range of not less than 1.5 but not more than 1.8.

5. The pneumatic tire according to claim 1, wherein said carcass ply main portion and said turned up portion forming two sides of the triangle cord arrangement are the same carcass ply.

* * * * *